US008817136B2

(12) United States Patent
King

(10) Patent No.: US 8,817,136 B2
(45) Date of Patent: Aug. 26, 2014

(54) IMAGE PROCESSING UTILIZING SPATIALLY-DISPLACED IMAGE DATA

(75) Inventor: Donald F. King, Ventura, CA (US)

(73) Assignee: Raytheon Company, Waltham, MA (US)

( * ) Notice: Subject to any disclaimer, the term of this patent is extended or adjusted under 35 U.S.C. 154(b) by 360 days.

(21) Appl. No.: 12/821,257

(22) Filed: Jun. 23, 2010

(65) Prior Publication Data

US 2011/0317033 A1 Dec. 29, 2011

(51) Int. Cl.
*H04N 9/64* (2006.01)
*H04N 5/367* (2011.01)
*H04N 5/232* (2006.01)
*H04N 5/76* (2006.01)
*H04N 5/262* (2006.01)
*H04N 5/77* (2006.01)

(52) U.S. Cl.
CPC .......... *H04N 5/23238* (2013.01); *H04N 5/367* (2013.01); *H04N 5/772* (2013.01)
USPC ....... 348/246; 348/247; 348/231.99; 348/239

(58) Field of Classification Search
USPC .............................. 348/231.99, 239, 246, 247
See application file for complete search history.

(56) References Cited

U.S. PATENT DOCUMENTS

| | | | |
|---|---|---|---|
| 6,088,612 A * | 7/2000 | Blair .............................. | 600/407 |
| 6,717,608 B1 * | 4/2004 | Mancuso et al. ................ | 348/36 |
| 6,782,139 B2 * | 8/2004 | Bender et al. .................. | 382/278 |
| 7,202,894 B2 | 4/2007 | Kaplinsky et al. | |
| 7,250,969 B2 | 7/2007 | Sakurai et al. | |
| 7,620,241 B2 * | 11/2009 | Fan et al. ........................ | 382/167 |
| 7,656,429 B2 * | 2/2010 | Larson ..................... | 348/208.14 |
| 2002/0140829 A1 * | 10/2002 | Colavin et al. ............ | 348/231.99 |
| 2006/0115178 A1 * | 6/2006 | Fan et al. ....................... | 382/275 |
| 2006/0268130 A1 * | 11/2006 | Williams et al. ............... | 348/239 |
| 2006/0268131 A1 * | 11/2006 | Cutler ............................ | 348/239 |
| 2007/0159524 A1 * | 7/2007 | Kim et al. ........................ | 348/36 |
| 2008/0180550 A1 * | 7/2008 | Gulliksson ............... | 348/231.99 |
| 2009/0092321 A1 | 4/2009 | Liberman et al. | |

OTHER PUBLICATIONS

Northrop Grumman's E-2C Marks Successful First Live-Fire Test of Ballistic Missile Sensor, http://www.irconnect.com/noc/press/pages/news_releases.html?d=19546, 2 pages, Aug. 20, 2001.

(Continued)

*Primary Examiner* — Sinh Tran
*Assistant Examiner* — Christopher K Peterson
(74) *Attorney, Agent, or Firm* — Burns & Levinson LLP; Joseph P. Maraia

(57) ABSTRACT

According to certain embodiments, alpha image data of an alpha frame corresponding to an alpha portion of a scene is accessed. Beta image data of a beta frame corresponding to a beta portion of the scene is accessed. The alpha frame and the beta frame have an overlapping region. Alpha-beta pairs are generated for the overlapping region. Each alpha-beta pair comprises an alpha value of the alpha image data and a beta value of the beta image data that both correspond to the same portion of the scene. A function is applied to each alpha-beta pair to determine first frame image data for the overlapping region. The first frame image data comprises information to generate a first frame of the scene.

22 Claims, 3 Drawing Sheets

(56) References Cited

OTHER PUBLICATIONS

Burgess, Richard R., Sea Power, Hawkeye-mounted SIRST sensor tracks ballistic missile target, http://findarticles.com/p/articles/mi_qa3738/is_200110/ai_n8975713, 2 pages, Oct. 2001.

McCaslin, Martha, CERDEC NVESD, Sensor Technology Can Detect And Identify Targets Faster, Farther, CERDEC U.S. Army Research, Development, and Engineering Command, http://www.cerdec.army.mil/news/cerdec_sensor2.asp, 1 page, Jun. 20, 2010.

* cited by examiner

IMAGE PROCESSING UTILIZING SPATIALLY-DISPLACED IMAGE DATA

TECHNICAL FIELD

This invention relates generally to the field of imaging systems and more specifically to image processing utilizing spatially-displaced image data.

BACKGROUND

Imaging systems often incorporate arrays of detector elements that sense radiation over a portion of the electro-magnetic spectrum to generate images of scenes. In some cases, one or more elements may be defective or non-responsive. These array defects may degrade the performance of the system and/or quality of the generated images.

In certain systems, the aspect ratio of the generated image may be the same as the aspect ratio of the detector array. In certain situations, an aspect ratio that differs from that of the detector array, for example, a wider aspect ratio, may be desired for the generated image.

SUMMARY OF THE DISCLOSURE

In accordance with the present invention, disadvantages and problems associated with previous techniques may be reduced or eliminated.

According to certain embodiments, alpha image data of an alpha frame and beta image data of a beta frame are accessed. The alpha image data corresponds to an alpha portion of a scene, and the beta image data corresponds to a beta portion of the scene. The alpha portion of the scene and the beta portion of the scene are displaced from one another in one or two dimensions by an amount corresponding to as little as the effective subtense of one or two detector elements, or by an amount equivalent to a large fraction of the entire detector array subtense (for example, 50% or greater). First generated frame image data is determined from the alpha image data and the beta image data. The first frame image data comprises information to generate a first frame of the scene.

According to certain embodiments, alpha image data of an alpha frame corresponding to an alpha portion of a scene is accessed. Beta image data of a beta frame corresponding to a beta portion of the scene is accessed. The alpha frame and the beta frame have an overlapping region. Alpha-beta pairs are generated for the overlapping region. Each alpha-beta pair comprises an alpha value of the alpha image data and a beta value of the beta image data that both correspond to the same portion of the scene. A function is applied to each alpha-beta pair to determine first frame image data for the overlapping region. The first frame image data comprises information to generate a first frame of the scene.

Certain embodiments of the invention may provide one or more technical advantages. A technical advantage of one embodiment may be that the combined image data generated has an overlapping region corresponding to the overlapping alpha and beta portions of the scene. The overlapping region has data available from both the alpha and beta image frames, so higher quality data (such as non-defective data) may be selected and/or the data may be processed to reduce defects and improve the quality and/or performance of the resulting generated image.

Another technical advantage of one embodiment may be that image data from an alpha portion of a scene may be combined with image data from a beta portion of the scene that overlaps the alpha portion. The combined image data generated from the overlapping image frame may yield an image with a wider aspect ratio than that of an image of either individual image frame.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4B of the drawings, like numerals being used for like and corresponding parts of the various drawings.

Figure 1:
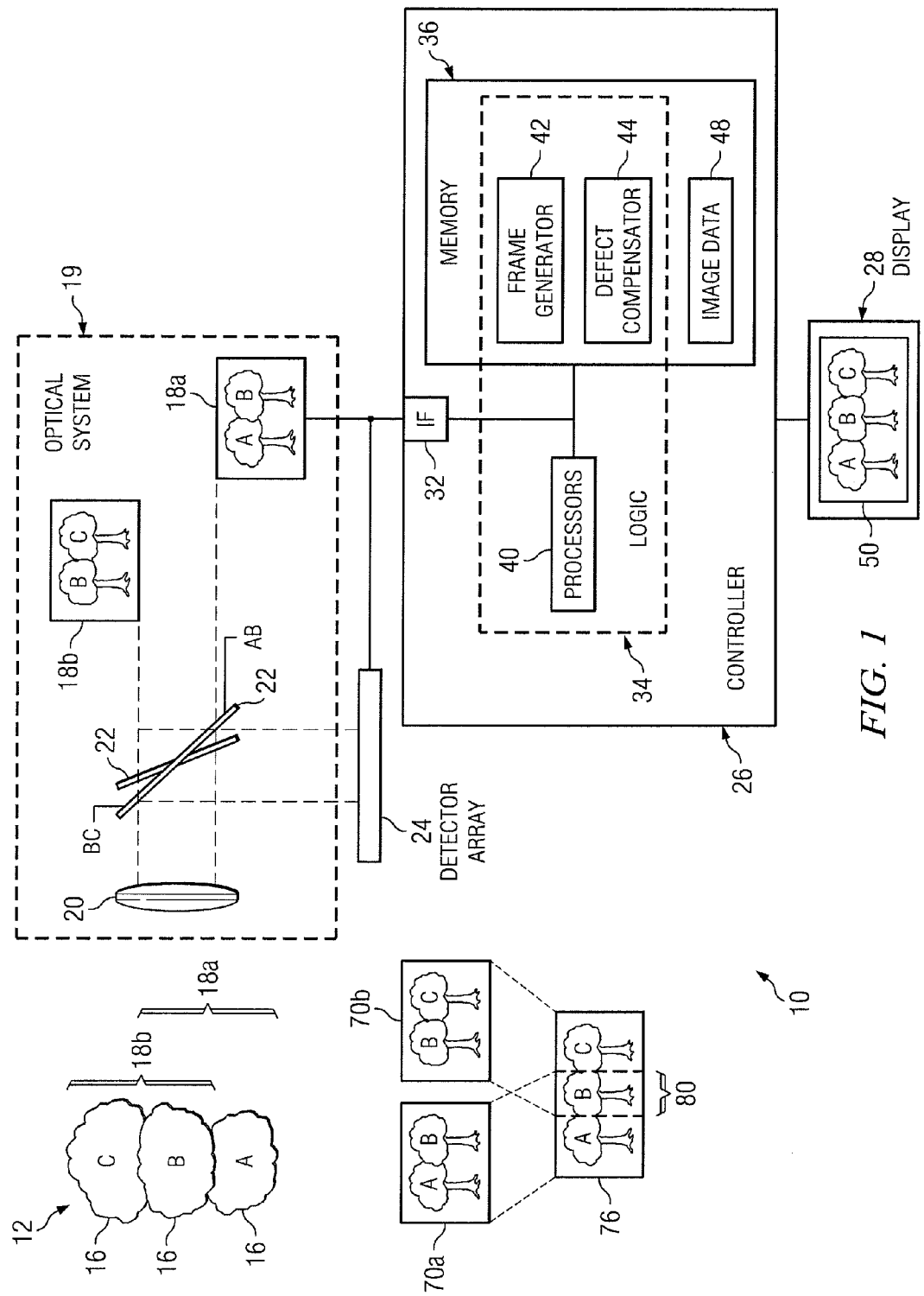
FIG. 1 illustrates an example of a system that may be used to generate image data of a scene.

FIG. 1 illustrates an example of a system 10 that may be used to generate image data of a scene 12. In the illustrated example, scene 12 includes objects 16 that reflect and/or emit light. In the illustrated example, system 10 includes an optical system 19 (which includes one or more optics 20 and one or more reflecting surfaces 22), a detector array 24, a controller 26, and a display 28 coupled as shown. Controller 26 includes an interface 32, logic 34, and a memory 36. Logic 34 includes processors 40 and applications such as frame generator 42 and a defect compensator 44. Memory 36 stores image data 48 and applications. Display 28 displays an image 50 of a scene 12.

In certain examples of operation, controller 26 may access image data 48. Image data 48 may include alpha image data of an alpha frame 70a generated from an alpha portion 18a of scene 12 and beta image data of a beta frame 70b generated from a beta portion 18a of scene 12. Alpha frame 70a and beta frame 70b may have an overlapping region 80. Controller 26 may determine first frame image data from the alpha image data and the beta image data. The first frame image data comprises information to generate a first frame 76 of image 50 of scene 12. In certain examples, the aspect ratio of first frame 76 may be different from (such as wider than) the aspect ratio of the alpha or beta frame 70. An aspect ratio of an image is the ratio of the width of the image to the height of the image. In other examples, overlapping region 80 may be very large, (for example, 98% or greater, but less than 100%) and the aspect ratio of first frame 76 may be substantially similar to the aspect ratio of the alpha or beta frame 70.

In certain examples of operation, controller 26 may identify one or more defects affecting one or more alpha values corresponding to one or more portions 18 of scene 12. Controller 26 may identify one or more beta values of the beta image data corresponding to the one or more portions 18 of scene 12. Controller 26 may give greater weight to the beta values than to the alpha values. Controller 26 may determine the frame image data from the weighted alpha image data and the weighted beta image data.

In the illustrated example, scene 12 includes objects 16 that reflect and/or emit light that may be used to generate image 50 of scene 12. In the illustrated example, scene 12 includes objects A, B, and C. Scene 12 may have different portions 18 (18a-b) that include different objects 16. For example, portion 18a includes objects A and B, and portion 18b includes objects B and C. In certain examples, portions 18 may overlap. For example, portions 18a-b overlap such that both portions include object B.

Optical system 19 directs light from scene 12 to detector array 24. In certain embodiments, optics 20 may include one or more of any suitable optical devices that may transmit, direct, focus, reflect, and/or refract light. In certain embodiments, optics 20 receives light from objects 16 and directs the light towards reflecting surface 22. In certain embodiments, a reflecting surface 22 reflects and/or directs the light towards detector array 24. In certain embodiments, reflecting surface 22 may move to different positions in order to direct different portions 18 of scene 12 to detector array 24. For example, in position AB, reflecting surface 22 may direct light from portion 18a toward detector array 24, and in position BC, detector array 22 may direct light from portion 18b towards detector array 24.

Detector array 24 may comprise a two-dimensional array of detector elements that can detect light and generate signals that represents the detected light. The generated signals may be used to create image 50. In certain embodiments, a detector element (or sensel) may generate a signal that indicates the amount and/or wavelength of light detected by the element. Examples of detector array 24 include a focal plane array or a charge-coupled detector.

Controller 26 controls the operation of system 10. In certain embodiments, controller 26 may control the movement of reflecting surface 22, control the operation of detector array 24, process signals received from detector array 24 to yield image data, and/or send the processed signals to display 28 to display image 50.

Image data 48 may comprise information that display 50 can use to generate a frame of scene 12. In certain embodiments, image data 48 may include image values that correspond to points of scene 12. For example, an image value may indicate the amount and/or wavelength of light from a point of scene 12 that is detected at a detector element. As another example, the image value may be a value for a pixel of image 50 that depicts a point of scene 12. A frame 70 generated from image data 48 may be an image 50 at a particular time. Frames 70 may be generated at successive times to yield a moving image 50 of scene 12.

Alpha and beta image data may refer to image data that can be used to generate a frame 70 (70a-b) of a portion 18 (18a-b) of a scene. For example, alpha image data may be used to generate alpha frame 70a that represents alpha portion 18a of scene 12, and beta image data may be used to generate beta frame 70b that represents beta portion 18a of scene 12. Alpha frame 70a and beta frame 70b may have an overlapping region 80 that is at least ten percent of alpha frame 70a.

Frame generator 42 generates frames 70 of scene 12 in order to create image 50 of scene 12. In certain embodiments, frame generator 42 may access image data 48. Frame generator 42 may determine first frame image data from the alpha image data and the beta image data. The first frame image data comprises information to generate a first frame 76 of image 50 of scene 12.

First frame 76 of image 50 may have an overlapping region 80 at which alpha and beta frames have been overlapped. Overlapping region 80 may be any suitable region of scene 12. The overlapping parts of the alpha and beta frames are generated from and/or depict substantially the same portion of scene 12. In certain embodiments, overlapping region 80 may be any suitable percentage of the alpha frame. For example, overlapping region 80 may be a relatively small percentage (for example, 25% or smaller) of the alpha frame to yield a first frame 76 which is much wider (for example, 175% or greater) than the widths of the alpha or beta frames. As another example, overlapping region 80 may be a very large percentage of the alpha frame (for example, 98% or greater, but less than 100%) to reduce the impact of defects and/or improve the quality and/or performance over a very large percentage of first frame 76 (for example, 96% or greater).

In certain embodiments, overlapping region 80 (which may be higher-quality and higher-performing) may be a central region of scene 12, and in that respect similar to foveal vision in the human eye. In certain situations, the central portion of a generated image may be of greater importance to a user compared to the outer portions of the image. Accordingly, a higher image quality may be desired in the central region.

Frame generator 42 may determine first frame image data of first frame 76 from the alpha and beta image data in any suitable manner. In certain embodiments, frame generator 42 may identify the alpha image data and the beta image data corresponding to overlapping region 80. The image data corresponding to the overlapping region may be identified in any suitable manner. For example, the size of overlapping region 80 may be determined, for example, with respect to the percentage of the alpha frame. The portion of the beta frame that covers that predetermined percentage may be determined to be in overlapping region 80.

Frame generator 42 may combine alpha and beta image data of overlapping region 80 in any suitable manner. In certain embodiments, frame generator 42 may generate alpha-beta pairs. Each alpha-beta pair comprises an alpha value and a beta value that both correspond to the same point of scene 12. In certain embodiments, frame generator 42 may apply a function to each alpha-beta pair to process the data to determine the first frame image data for the overlapping region. Any suitable function may applied. For example, an averaging and/or adding function may be applied. As another example, a function may assign weights to the values and then add and/or average the weighted values.

Frame generator 42 may determine first frame image data from the alpha and beta image data in any suitable manner. An example of this operation is described in more detail with reference to FIG. 3.

Image data of any suitable frame size may be combined to yield combined image data that may be used to generate any suitable resulting frame. In certain embodiments, frame generator 42 may be used to generate images 50 that have a wider aspect ratio than that typically generated by detector array 24. For example, detector array 24 may be designed to generate frames with a 4:3 aspect ratio. Frame generator 42 may overlap two frames generated by detector array 24 to yield an image 50 with a wider aspect ratio, for example, a 16:9 or a 2:1 aspect ratio.

In certain embodiments, frame generator 42 may perform other suitable operations. For example, frame generator 42 may compensate for distortion caused by optics 20. The compensation may be used to properly align alpha image data with beta image data such that each alpha value of the alpha image data and each beta value of the beta image data that both correspond to the same point of scene 12 ("corresponding values") are aligned.

As another example, frame generator 42 may access correction coefficients that are used to correct image data and apply the correction coefficients to the image data. As another example, frame generator 42 may enable or disable the process in response to an instruction from a user.

Defect compensator 44 reduces defects of image 50. A defect may be any problem with system 10 that decreases the quality of image 50. A defect may affect one or more image values corresponding to a portion of scene 12, which may affect the corresponding portion of image 50. For example, the defect may be a problem with one or more detector elements of detector array 24. The problem may cause the detector to generate a signal that does not accurately represent scene 12.

In certain examples of operation, defect compensator may identify defects in any suitable manner. In certain embodiments, defect compensator 44 may identify the defects using a defect map indicating the defects. For example, a defect map may indicate pixels that have defects. An example of a method for reducing defects is described in more detail with reference to FIGS. 4A and 4B.

Display 50 is any suitable device configured to display image 50 of scene 12. Display 28 may be any suitable size and/or shape. In certain embodiments, controller 26 may include frame generator 42 and defect compensator 44, only frame generator 42, or only defect compensator 44.

Certain known systems may use mathematical algorithms to overcome the negative impact of defective detector elements. The mathematical algorithms may be used to create replacement image data from neighboring non-defective detector elements to substitute for defective image data from defective detector elements. The replacement data, however, does not represent the scene information at the defective pixels locations. In some situations, the replacement data may result in undesirable image artifacts. In certain embodiments, system 10 may reduce or eliminate one or more of these problems.

Figure 2:
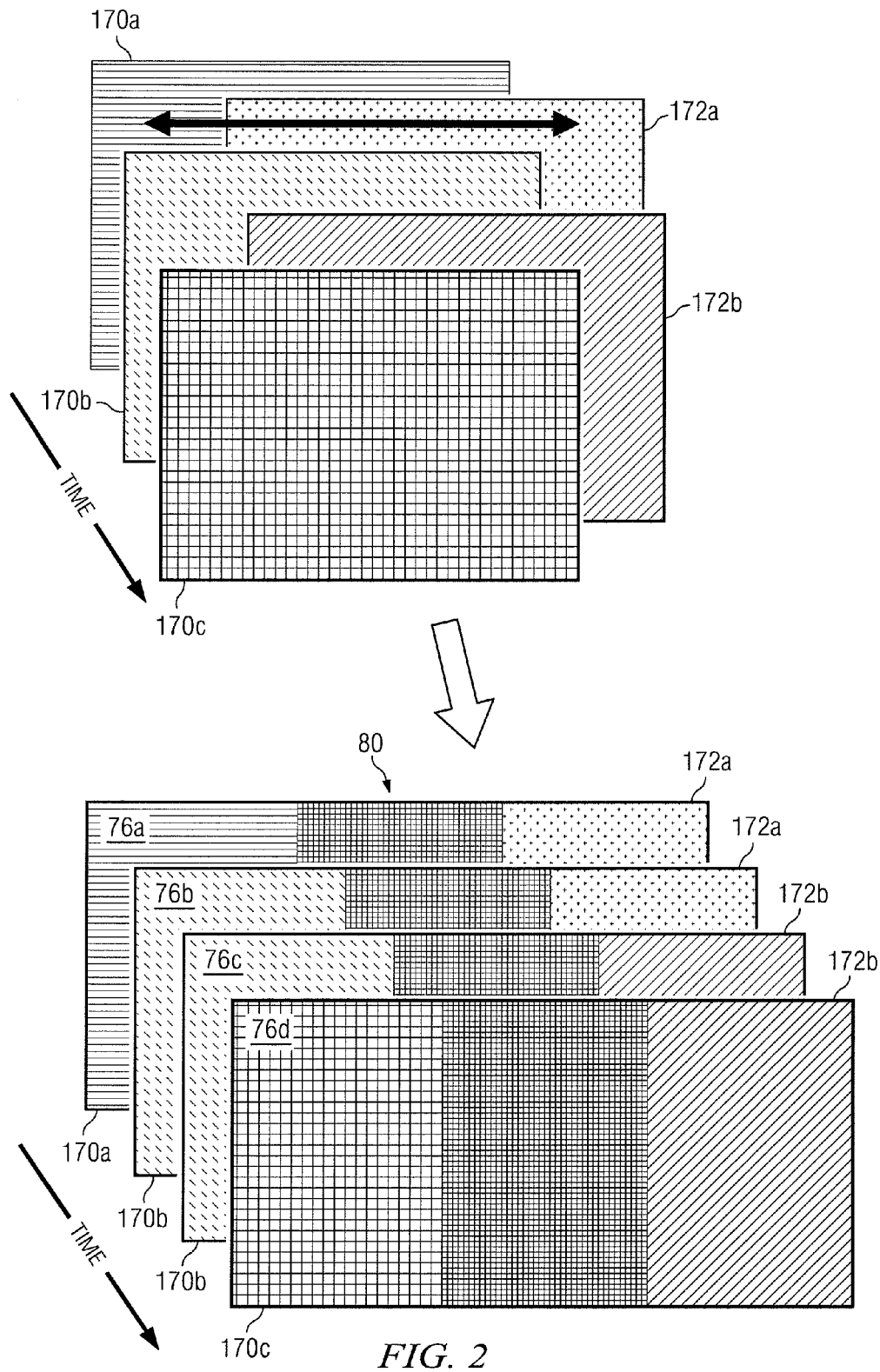
FIG. 2 illustrates an example of a method for combining image data.

FIG. 2 illustrates an example of a method for combining image data. In the illustrated example, the resulting frames 176 (176*a-d*) may be generated at the same rate that the alpha 170 (170*a-c*) and beta frames 170 (170*a-b*) are generated. In the illustrated example, first frame image data of a first frame 176*a* is determined from alpha image data of an alpha frame 170*a* and beta image data of a beta frame 172*a*. This may be described as "first frame 176*a* is determined from alpha frame 170*a* and beta frame 172*a*." Second frame 176*b* is determined from a next alpha frame 170*b* and beta frame 172*a*. Third frame 176*c* is determined from alpha frame 170*b* and next beta frame 172*b*. Fourth frame 176*d* is determined from a next alpha frame 170*c* and beta frame 172*b*, and so on.

In other examples of methods, a first frame may be generated from alpha frame 170*a* and beta frame 172*a*, a second frame may be generated from alpha frame 170*b* and beta frame 172*b*, and so on.

Figure 3A:
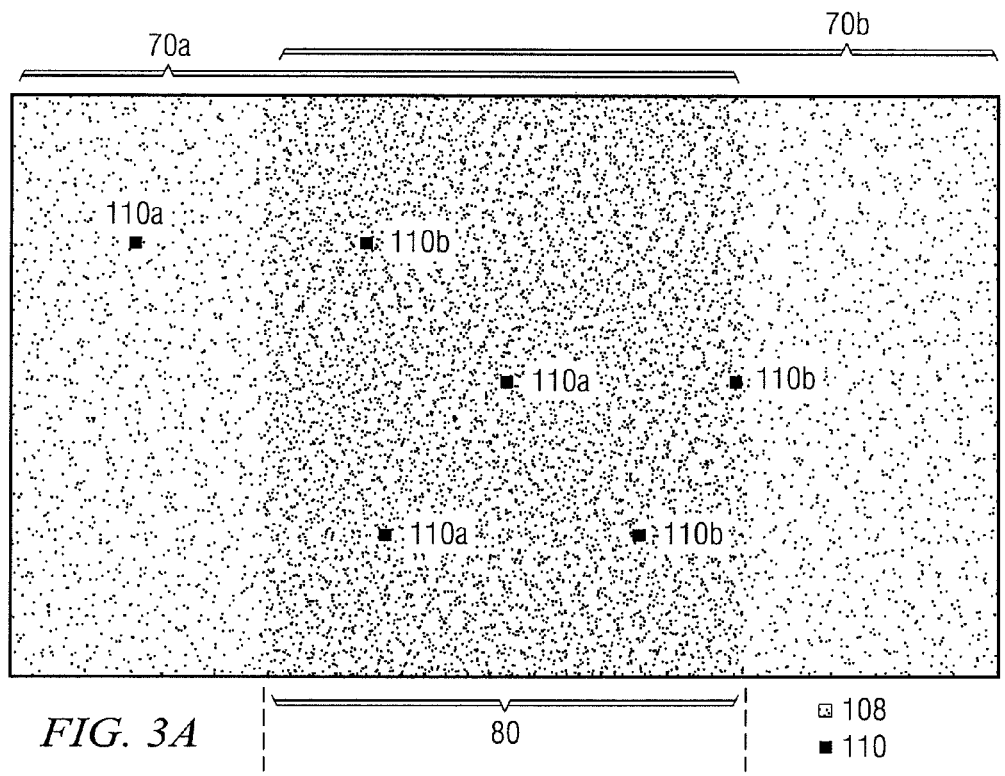
FIGS. 3A and 3B illustrate an example of a method for reducing defects of a frame.
Figure 3B:
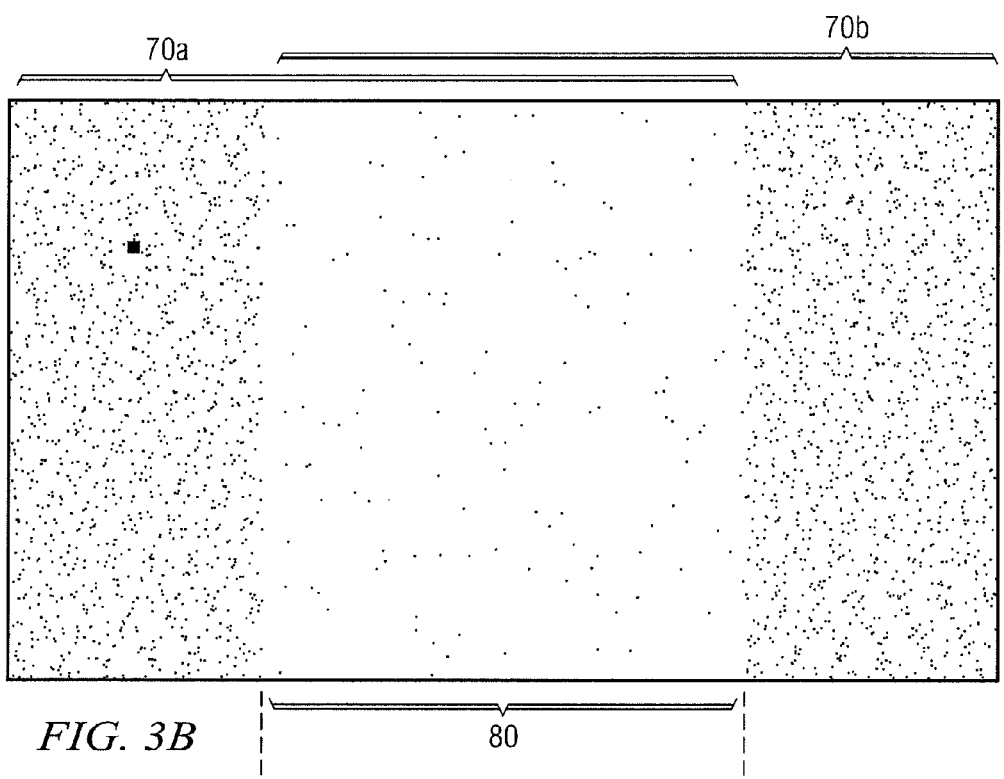

FIGS. 3A and 3B illustrate an example of a method for reducing defects 108, 110 of a frame 76. The method may be performed by defect compensator 44. In the illustrated example, a dot may represent a defect 108, and a square may represent a cluster of defects 110 (110*a-b*).

In certain embodiments, defect compensator 44 may identify one or more defects 110*a* affecting one or more alpha values of alpha frame 70*a* that correspond to one or more portions of scene 12. Defect compensator 44 may identify one or more beta values of beta frame 70*b* that correspond to the same portions of scene 12. Defect compensator 44 may give greater weight to the beta values than to the alpha values.

Frame generator 42 may determine the frame image data from the weighted alpha image data and the weighted beta image data.

In certain embodiments, defect compensator may perform a similar operation with beta frame 70*b*. Defect compensator 44 may identify one or more other defects 110*b* affecting one or more other beta values of beta frame 70*b* that correspond to one or more other portions of scene 12. Defect compensator 44 may identify one or more other alpha values of the alpha image data that correspond to the same portions of scene 12. Defect compensator 44 may give greater weight to the one or more other beta values than that of the one or more other alpha values. According, defects 108, 110 of overlapping region 80 may be reduced.

Defect compensator 44 may assign weights in any suitable manner. Values corresponding to the same point of scene 12 may be weighted in any suitable manner. For example, the beta value may have a weight $w1$, and the alpha value may have a weight $w2$, where $w2=1-w1$. Weight $w1$ may have any suitable value, such as a value in the range of 50 to 75 percent, 75 to 90 percent, or greater than 90 percent. For example, weight $w1=0$ and weight $w2=1$, that is, the beta value is used but the alpha value is not.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of frame generator 42 and defect compensator may be performed by one component, or the operations of controller 26 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, executed by one or more processors adapted to communicate with a detector array, the method comprising:
    accessing alpha image data of an alpha frame generated from an alpha portion of a scene, the alpha portion of the scene being captured by an alpha subset of detector elements of the detector array;
    accessing beta image data of a beta frame generated from a beta portion of the scene, the beta portion of the scene being captured by a beta subset of detector elements of the detector array, wherein the alpha subset of detector elements and the beta subset of detector elements are displaced in at least one dimension of a fraction of the detector array;
    generating a plurality of alpha-beta pairs for an overlapping region of the alpha frame and the beta frame, each alpha-beta pair comprising an alpha value of the alpha image data and a beta value of the beta image data that both correspond to a same portion of the scene;
    identifying defects associated with a problem corresponding to one or more detector elements of the detector array based on the plurality of alpha-beta pairs for the overlapping region, the problem causing the one or more detector elements to generate a signal that does not accurately represent the one or more portions of the scene;
    weighing the alpha value and the beta value for each of the plurality of alpha-beta pairs based on the identified defects affecting the alpha value or the beta value of each of the plurality of alpha-beta pairs; and
    applying a function based on the weighting of the alpha value and the beta value to each alpha-beta pair to determine first frame image data for the overlapping region, the first frame image data comprising information to generate a first frame of the scene.

2. The method of claim 1, the applying the function to each alpha-beta pair comprising:
    averaging the alpha value and the beta value of each alpha-beta pair of the overlapping region.

3. The method of claim 1, the applying the function to each alpha-beta pair comprising:
    adding the alpha value and the beta value of each alpha-beta pair of the overlapping region.

4. The method of claim 1, the applying the function to each alpha-beta pair comprising:
    using the alpha value instead of the beta value for the first frame image data for the overlapping region.

5. The method of claim 1, further comprising:
    accessing next alpha image data of a next alpha frame generated from the first portion of the scene; and
    determining second frame image data from the next alpha frame and the beta frame, the second frame image data comprising information to generate a second frame of the scene.

6. The method of claim 1 further comprising:
    generating a defect map of the identified defects.

7. An apparatus comprising:
    a memory configured to:
        store alpha image data of an alpha frame generated from an alpha portion of a scene, the alpha portion of the scene being captured by an alpha subset of detector elements of a detector array;
        store beta image data of a beta frame generated from a beta portion of the scene, the beta portion of the scene being captured by a beta subset of detector elements of the detector array, wherein the alpha subset of detector elements and the beta subset of detector elements are displaced in at least one dimension of a fraction of the detector array; and
    one or more processors configured to:
        access the alpha image data and the beta image data;
        generate a plurality of alpha-beta pairs for an overlapping region of the alpha frame and the beta frame, each alpha-beta pair comprising an alpha value of the alpha image data and a beta value of the beta image data that both correspond to a same portion of the scene;
        identify defects associated with a problem corresponding to one or more detector elements of the detector array based on the plurality of alpha-beta pairs for the overlapping region, the problem causing the one or more detector elements to generate a signal that does not accurately represent the one or more portions of the scene;
        weigh the alpha value and the beta value for each of the plurality of alpha-beta pairs based on the identified defects affecting the alpha value or the beta value of each of the plurality of alpha-beta pairs; and
        apply a function based on the weight of the alpha value and the beta value to each alpha-beta pair to determine first frame image data for the overlapping region, the first frame image data comprising information to generate a first frame of the scene.

8. The apparatus of claim 7, the applying the function to each alpha-beta pair comprising:
    averaging the alpha value and the beta value of each alpha-beta pair of the overlapping region.

9. The apparatus of claim 7, the applying the function to each alpha-beta pair comprising:
    adding the alpha value and the beta value of each alpha-beta pair of the overlapping region.

10. The apparatus of claim 7, the applying the function to each alpha-beta pair comprising:
    using the alpha value instead of the beta value for the first frame image data for the overlapping region.

11. The apparatus of claim 7, the one or more processors configured to:
   access next alpha image data of a next alpha frame generated from the first portion of the scene; and
   determine second frame image data from the next alpha frame and the beta frame, the second frame image data comprising information to generate a second frame of the scene.

12. The apparatus of claim 7 wherein the one or more processors are further configured to:
   generate a defect map of the identified defects.

13. A method, executed by one or more processors adapted to communicate with a detector array, the method comprising:
   accessing alpha image data of an alpha frame generated from an alpha portion of a scene, the alpha portion of the scene being captured by an alpha subset of detector elements of the detector array;
   accessing beta image data of a beta frame generated from a beta portion of the scene, the beta portion of the scene being captured by a beta subset of detector elements of the detector array, wherein the alpha subset of detector elements and the beta subset of detector elements are displaced in at least one dimension of a fraction of the detector array;
   identifying one or more defects affecting one or more alpha values of the alpha image data corresponding to one or more portions of the scene based on a plurality of alpha-beta pairs of an overlapping region of the alpha frame and the beta frame, the identified defects associated with a problem corresponding to one or more detector elements of a detector array, the problem causing the one or more detector elements to generate a signal that does not accurately represent the one or more portions of the scene;
   identifying one or more beta values of the beta image data corresponding to the one or more portions of the scene;
   giving greater weight to the one or more beta values than to the one or more alpha values; and
   determining first frame image data from the weighted alpha image data and the weighted beta image data, the first frame image data comprising information to generate a first frame of the scene.

14. The method of claim 13, further comprising:
   identifying one or more other defects affecting one or more other beta values of the beta image data corresponding to one or more other portions of the scene;
   identifying one or more other alpha values of the alpha image data corresponding to the one or more other portions of the scene; and
   giving greater weight to the one or more other beta values than to the one or more other alpha values.

15. The method of claim 13, the giving greater weight to the one or more beta values comprising:
   using a beta value corresponding to a portion of the scene instead of an alpha value corresponding to the portion of the scene.

16. The method of claim 13, the identifying the defects comprising:
   identifying the defects using a defect map indicating the defects.

17. The method of claim 13 further comprising:
   generating a defect map of the identified defects.

18. An apparatus comprising:
   a memory configured to:
      store alpha image data of an alpha frame generated from an alpha portion of a scene, the alpha portion of the scene being captured by an alpha subset of detector elements of a detector array;
      store beta image data of a beta frame generated from a beta portion of the scene, the beta portion of the scene being captured by a beta subset of detector elements of the detector array, wherein the alpha subset of detector elements and the beta subset of detector elements are displaced in at least one dimension of a fraction of the detector array; and
   one or more processors configured to:
      access the alpha image data and the beta image data;
      identify one or more defects affecting one or more alpha values of the alpha image data corresponding to one or more portions of the scene based on a plurality of alpha-beta pairs of an overlapping region of the alpha frame and the beta frame, the identified defects associated with a problem corresponding to one or more detector elements of a detector array, the problem causing the one or more detector elements to generate a signal that does not accurately represent the one or more portions of the scene;
      identify one or more beta values of the beta image data corresponding to the one or more portions of the scene;
      give greater weight to the one or more beta values than to the one or more alpha values; and
      determine first frame image data from the weighted alpha image data and the weighted beta image data, the first frame image data comprising information to generate a first frame of the scene.

19. The apparatus of claim 18, the one or more processors configured to:
   identify one or more other defects affecting one or more other beta values of the beta image data corresponding to one or more other portions of the scene;
   identify one or more other alpha values of the alpha image data corresponding to the one or more other portions of the scene; and
   give greater weight to the one or more other beta values than to the one or more other alpha values.

20. The apparatus of claim 18, the one or more processors configured to give greater weight to the one or more beta values by:
   using a beta value corresponding to a portion of the scene instead of an alpha value corresponding to the portion of the scene.

21. The apparatus of claim 18, the one or more processors configured to identify the defects by:
   identifying the defects using a defect map indicating the defects.

22. The apparatus of claim 18 wherein the one or more processors are further configured to:
   generate a defect map of the identified defects.

* * * * *